US012583987B2

(12) United States Patent
Yao et al.

(10) Patent No.: US 12,583,987 B2
(45) Date of Patent: Mar. 24, 2026

(54) SURFACE MODIFYING COMPOSITION, MODIFIED PRODUCT, AND METHOD OF PRODUCING MODIFIED PRODUCT

(71) Applicants: Fukuoka University, Fukuoka (JP); RDG CO., LTD., Tokyo (JP)

(72) Inventors: Shigeru Yao, Fukuoka (JP); Sho Hirai, Fukuoka (JP); Hideaki Obuchi, Fukuoka (JP); Ryoko Nakano, Fukuoka (JP); Shoichi Ishimoto, Tokyo (JP)

(73) Assignees: FUKUOKA UNIVERSITY, Fukuoka (JP); RDG CO., LTD., Tokyo (JP)

( * ) Notice: Subject to any disclaimer, the term of this patent is extended or adjusted under 35 U.S.C. 154(b) by 0 days.

(21) Appl. No.: 17/959,884

(22) Filed: Oct. 4, 2022

(65) Prior Publication Data

US 2023/0041238 A1     Feb. 9, 2023

Related U.S. Application Data

(62) Division of application No. 16/754,359, filed as application No. PCT/JP2018/030685 on Aug. 20, 2018, now abandoned.

(30) Foreign Application Priority Data

Oct. 11, 2017     (JP) ................................. 2017-197695

(51) Int. Cl.
| | |
|---|---|
| *C08J 7/12* | (2006.01) |
| *B05D 7/02* | (2006.01) |
| *B05D 7/24* | (2006.01) |
| *C08F 265/06* | (2006.01) |
| *C09D 11/02* | (2014.01) |
| C08F 293/00 | (2006.01) |

(52) U.S. Cl.
CPC .................. *C08J 7/12* (2013.01); *B05D 7/02* (2013.01); *B05D 7/24* (2013.01); *C08F 265/06* (2013.01); *C09D 11/02* (2013.01); *C08F 293/00* (2013.01); *C08J 2433/10* (2013.01); *C08J 2433/26* (2013.01)

(58) Field of Classification Search
CPC .... B05D 1/18; B05D 2201/00; B05D 3/0254; B05D 7/02; B05D 7/24; C08F 2438/02; C08F 265/06; C08F 293/00; C08F 293/005; C08J 2323/06; C08J 2433/10; C08J 2433/26; C08J 2453/00; C08J 7/0427; C08J 7/12; C09D 11/02; C09D 153/00; C09D 201/02; C09D 7/20; D06M 15/263; D06M 15/267; D06M 15/273; D06M 2101/20; D06M 23/10; D06P 3/79; D06P 5/002
See application file for complete search history.

(56) References Cited

U.S. PATENT DOCUMENTS

| | | | |
|---|---|---|---|
| 6,710,127 B2 | 3/2004 | Haubennestel et al. | |
| 2004/0059064 A1 | 3/2004 | Usui et al. | |
| 2013/0224413 A1 | 8/2013 | Prouvost et al. | |
| 2014/0045053 A1* | 2/2014 | Ichikawa ............. | C10M 149/04 429/188 |
| 2017/0121576 A1* | 5/2017 | Bartholomew ........ | C09J 153/00 |
| 2018/0327561 A1 | 11/2018 | Yao et al. | |

FOREIGN PATENT DOCUMENTS

| | | |
|---|---|---|
| JP | S-48-020844 | 3/1973 |
| JP | 2014-234397 A | 12/2014 |
| JP | 2015-061900 A | 4/2015 |
| JP | 2015-229725 A | 12/2015 |
| JP | 2017-192875 A | 10/2017 |
| RU | 2561968 C | 9/2015 |
| WO | WO 2015/186828 A1 | 12/2015 |

OTHER PUBLICATIONS

International Search Report and Written Opinion for PCT International Application No. PCT/JP2018/030685, with Translation, 12 pages, dated Nov. 6, 2018.

* cited by examiner

*Primary Examiner* — Gregory Listvoyb
(74) *Attorney, Agent, or Firm* — SQUIRE PATTON BOGGS (US)

(57) ABSTRACT

A surface modifying composition for modifying a surface of a formed product made of high-density polyethylene or ultra-high molecular weight polyethylene, the composition comprising:
  a copolymer having a unit of a first monomer having an aliphatic group having 10 or more carbon atoms and a unit of a second monomer having any of an amino group, an epoxy group, and an ether group, and
  a solvent having a boiling point of 100° C. or more and being at least one selected from the group consisting of a halogen-based solvent, an alkane solvent, a cycloalkane solvent, a dicycloalkane solvent, an aromatic solvent, and a nitro-based solvent.

8 Claims, 2 Drawing Sheets

SURFACE MODIFYING COMPOSITION, MODIFIED PRODUCT, AND METHOD OF PRODUCING MODIFIED PRODUCT

CROSS-REFERENCE TO RELATED APPLICATIONS

This is a divisional application of U.S. patent application Ser. No. 16/754,359, filed on Apr. 7, 2020, which is a national-stage application under 35 U.S.C. § 371 Application of International Patent Application No. PCT/JP2018/030685, filed on Aug. 20, 2018, which claims priority to Japanese Application No. 2017-197695, filed on Oct. 11, 2017. The disclosures of the prior applications are hereby incorporated by reference in their entirety.

TECHNICAL FIELD

The present invention relates to a surface modifying composition, a modified product, and a method of producing the modified product.

BACKGROUND ART

Polyethylene is relatively inexpensive, easily processed, and excellent in water resistance, insulation, oil resistance, and chemical resistance among plastics. Thus, polyethylene is widely distributed as films, containers, and other various members, as household products and industrial products. For example, relatively flexible low-density polyethylene is used in members that require flexibility such as films, and relatively high-rigid high-density polyethylene are used in members that require rigidity. Among polyethylene, what is called ultra-high molecular weight polyethylene is classified as super engineering plastics and has an excellent mechanical property.

Although polyethylene is widely used like this, it has disadvantages of poor surface adhesion and being unsuitable for adhesion with other members, surface coating, surface printing, and the like, due to the nature of the resin thereof. If the surface modification of polyethylene becomes possible and the above disadvantages are resolved, promotion of the greater utilization of the polyethylene being already widely used and contribution to many product developments are anticipated.

As a surface modification technique of such a polyethylene, for example, a technique is known in which a hydrophilic functional group is introduced to the surface of a polyolefin by the hydrophilic treatment, and then the polyolefin is treated with a compound having two or more hydrolyzable silicon groups in one molecule, for the purpose of providing an inexpensive and effective method of improving coating property and printability of polyolefins (for example, see Patent Literature 1). Also, a method of modifying the surface of polyethylene by using a specific polymer is known (for example, see Patent Literature 2).

CITATION LIST

Patent Literature

Patent Literature 1: Japanese Patent Laid-Open No. 2014-234397
Patent Literature 2: Japanese Patent Laid-Open No. 2015-229725

SUMMARY OF INVENTION

Technical Problem

However, the hydrophilic treatment of Patent Literature 1 is specifically, a method of performing a corona discharge treatment, or a flame treatment by entirely or partly spraying a combustion flame containing a thermally decomposable surface modifier, and any of these methods cannot be conveniently utilized.

The present inventors have studied and found that the degree of surface modification of polyethylene according to the method disclosed in Patent Literature 2 is different depending on the low-density polyethylene, the high-density polyethylene, and the ultra-high molecular weight polyethylene. It has been found that the surface modification of the high-density polyethylene and the ultra-high molecular weight polyethylene is particularly more challenging as compared to that of the low-density polyethylene.

The present invention is made in view of the above problems and it is an object to provide a surface modifying composition capable of more effectively modifying the surface of a formed product made of high-density polyethylene or ultra-high molecular weight polyethylene that have been difficult to be sufficiently modified, a method of producing a modified product using the surface modifying composition, and the modified product.

Solution to Problem

That is, the present invention is as follows.

[1]

A surface modifying composition for modifying a surface of a formed product made of high-density polyethylene or ultra-high molecular weight polyethylene, the composition comprising:

a copolymer having a unit of a first monomer having an aliphatic group having 10 or more carbon atoms and a unit of a second monomer having any of an amino group, an epoxy group, and an ether group, and a solvent having a boiling point of 100° C. or more and being at least one selected from the group consisting of a halogen-based solvent, an alkane solvent, a cycloalkane solvent, a dicycloalkane solvent, an aromatic solvent, and a nitro-based solvent.

[2]

The surface modifying composition according to the above [1], wherein the first monomer constituting the copolymer comprises one or more selected from the group consisting of behenyl acrylate, behenyl methacrylate, stearyl acrylate, stearyl methacrylate, hexadecyl acrylate, hexadecyl methacrylate, lauryl acrylate, and lauryl methacrylate.

[3]

The surface modifying composition according to the above [1] or [2], wherein the second monomer constituting the copolymer comprises one or more selected from the group consisting of 2-(dimethylamino)ethyl acrylate, 2-(dimethylamino)ethyl methacrylate, 2-(diethylamino)ethyl acrylate, 2-(diethylamino)ethyl methacrylate, 2-(tert-butylamino) ethyl acrylate, 2-(tert-butylamino)ethyl methacrylate, N,N-dimethylacrylamide, N,N-diethylacrylamide, and N,N-dimethylaminopropyl acrylamide.

[4]

The surface modifying composition according to any one of the above [1] to [3], wherein the copolymer is a block copolymer, and a weight average molecular weight of a block of the first monomer is 2000 or more.

[5]

A modified product comprising a formed product made of high-density polyethylene or ultra-high molecular weight polyethylene, and a copolymer bound to the formed product, wherein the copolymer has a unit of a first monomer having an aliphatic group having 10 or more carbon atoms and a unit of a second monomer having any of an amino group, an epoxy group, and an ether group, and the copolymer is not separated from the formed product when left in water at 80° C. and in ethanol at 70° C. under the condition of 1 hour.

[6]

A method of producing a modified product comprising: a contacting step of warming a surface modifying composition to a temperature $T_1$, the surface modifying composition comprising a copolymer having a unit of a first monomer having an aliphatic group having 10 or more carbon atoms and a unit of a second monomer having any of an amino group, an epoxy group, and an ether group, and a solvent, and bringing the surface modifying composition into contact with a surface of a formed product made of high-density polyethylene or ultra-high molecular weight polyethylene; and a cooling step of lowering the temperature of the surface modifying composition from $T_1$ to $T_2$, wherein $T_1$ is a temperature 60° C. lower than the melting point Tm of the polyethylene constituting the formed product (Tm—60) or more, and $T_2$ is a temperature 80° C. lower than the melting point Tm of the polyethylene (Tm—80) or less.

[7]

A method of producing a colored product, comprising a coloring step of attaching an ink containing a dye or a pigment to the modified surface of the modified product obtained by the method of producing a modified product according to the above [6].

Advantageous Effects of Invention

According to the present invention, a surface modifying composition capable of more effectively modifying the surface of a formed product made of high-density polyethylene or ultra-high molecular weight polyethylene that have been difficult to be sufficiently modified, a method of producing a modified product using the surface modifying composition, and the modified product.

DESCRIPTION OF EMBODIMENTS

Figure 1:
FIG. 1 shows a photograph showing the results of dyeing woven fabrics with an ink in the dyeing test 1.

Hereinafter, embodiments of the present invention (here-inafter, referred to as "the present embodiment") will be described in detail. However, the present invention is not limited thereto and various modifications could be made without departing from the gist of the present invention.

[Surface Modifying Composition]

The surface modifying composition of the present embodiment is a surface modifying composition for modi-fying the surface of a formed product made of high-density polyethylene or ultra-high molecular weight polyethylene (hereinafter, also simply referred to as "formed product"), the composition comprising a copolymer having a unit of a first monomer having an aliphatic group having 10 or more carbon atoms and a unit of a second monomer having any of an amino group, an epoxy group, and an ether group, and a solvent having a boiling point of 100° C. or more and being at least one selected from the group consisting of a halogen-based solvent, an alkane solvent, a cycloalkane solvent, a dicycloalkane solvent, an aromatic solvent, and a nitro-based solvent.

According to the present embodiment, the density of "high-density polyethylene" is 0.945 to 1.011 g/cm$^3$. Examples of the high-density polyethylene include, but are not particularly limited to, for example, a homopolymer of ethylene, or a copolymer of ethylene with another α-olefin such as propylene, 1-butene, 1-pentene, 1-hexene, 1-octene, and 4-methyl-1-pentene. MFR of the high-density polyeth-ylene (Melt Flow Rate; ASTM D 1238, Load: 2160 g, Temperature: 190° C.) is preferably 0.1 to 50 g/10 minutes, and more preferably 0.2 to 35 g/10 minutes.

According to the present embodiment, "ultra-high molecular weight polyethylene" refers to a polyethylene whose intrinsic viscosity (IV) as measured on solution in decalin at 135° C. is preferably 5 dl/g or more, more preferably 10 dl/g or more, and further preferably 15 dl/g or more. The upper limit of the intrinsic viscosity of the ultra-high molecular weight polyethylene is not particularly limited, and is preferably 100 dl/g or less, more preferably 90 dl/g or less, and further preferably 80 dl/g or less.

According to the present embodiment, "formed product made of high-density polyethylene or ultra-high molecular weight polyethylene" may contain a plasticizer, and the like. The content of the high-density polyethylene and/or the ultra-high molecular weight polyethylene in a formed prod-uct is preferably 90 to 100 mass %, and more preferably 95 to 100 mass %. Examples of the shape of the formed product include, but are not particularly limited to, for example, a plate shape, a lot shape, a cylinder shape, a sphere shape, a rectangular shape, other block shapes, a sheet shape, a film shape, a fiber shape, or a porous membrane.

According to the present embodiment, "surface modify-ing composition" is used to attach the above copolymer to the surface of a formed product made of high-density polyethylene or ultra-high molecular weight polyethylene to modify the surface of the formed product. "Modification" refers to a state in which the moiety mainly having the unit of the first monomer in the above copolymer (hereinafter, also referred to as "long-chain alkane chain site") is adhered to the surface of a formed product.

This adhesion is considered to be caused by the bonding between the crystalline region of the molecular chain of the high-density polyethylene or the ultra-high molecular weight polyethylene constituting the surface of a formed product and the crystalline region constituted by the long-chain alkane chain site by intermolecular interaction (hereinafter, also referred to as "crystalline supramolecular interaction"), and the bonding in which molecular chains are entangled with each other such that the long-chain alkane chain site can be incorporated to the crystalline region of the molecular chain of the high-density polyethylene or the ultra-high molecular weight polyethylene constituting the surface of a formed product, in other words, bonding so as to form cocrystals (hereinafter, also referred to as "cocrystal interaction"). However, the form of adhesion is not limited thereto.

With respect to the crystalline supramolecular interaction and the cocrystal interaction, it is presumed that there is adhesion in which more crystalline supramolecular interactions are generated or adhesion in which more cocrystal interactions are generated, in generation of both the crystalline supramolecular interaction and the cocrystal interaction, rather than generation of either one of these interactions. In particular, the adhesion strength is different in the crystalline supramolecular interaction in which crystalline regions interact in a state adjacent to each other and the cocrystal interaction that is caused by the entanglement of the molecular chain, and the adhesion by cocrystal interaction is considered to form a stronger bond.

To exhibit the cocrystal interaction that requires the entanglement of the molecular chain, conceptually, a stage in which molecular chains are disentangled to the extent of being capable of entangling, a stage in which the disentangled molecular chains are entangled, and a stage in which the entangled molecular chains form cocrystal with each other are required, and it is presumed that there is a corresponding hurdle to achieve the interaction. According to the surface modifying composition of the present embodiment and a method of producing a modified product using thereof, the surface of a formed product made of high-density polyethylene or ultra-high molecular weight polyethylene that have been difficult to be sufficiently modified can be more effectively modified. The bond thereof is extremely strong and the reason may be mainly due to this cocrystal interaction. In this sense, the surface modifying composition of the present embodiment can be said to be a new composition as the surface modifying composition used in the method of producing a modified product that is warmed to a temperature 60° C. lower than the melting point Tm of the polyethylene constituting the formed product (Tm—60) or more. However, the mechanism for exerting the effect of the present embodiment is not limited to the above.

In the case where the surface of a formed product made of high-density polyethylene or ultra-high molecular weight polyethylene is modified in an article having a formed product made of high-density polyethylene or ultra-high molecular weight polyethylene and other members, this corresponds to "modifying the surface of a formed product made of high-density polyethylene or ultra-high molecular weight polyethylene".

By using the surface modifying composition of the present embodiment, the surface of a formed product can be modified depending on the property of the second monomer. More specifically, examples of the modification include hydrophilization of the surface of a formed product, improvement of adhesion strength upon adhering with an adhesive agent, and improvement of dye-affinity in the case of dyeing.

[Copolymer]

The copolymer used in the present embodiment has a unit of a first monomer having an aliphatic group having 10 or more carbon atoms and a unit of a second monomer having any of an amino group, an epoxy group, and an ether group. The copolymer may be a random copolymer or a block copolymer, and from the viewpoint of exerting the effect of the present embodiment, the block copolymer is preferred.

The aliphatic group present in the first monomer has 10 or more, preferably 14 or more, more preferably 16 or more, further preferably 18 or more, and particularly preferably 20 or more carbon atoms. With the number of carbon atoms in the aliphatic group within the above range, the adsorption strength to the surface of a formed product tends to be more improved. The upper limit of the number of carbon atoms in the aliphatic group is not particularly limited, and is preferably 30 or less. When the number of carbon atoms in the aliphatic group is within the above range, solubility in solvents tends to be more improved.

Examples of the aliphatic group include a linear aliphatic group, a branched aliphatic group, and a cyclic aliphatic group. Among them, from the viewpoint of the adsorption strength to the surface of a formed product, the linear aliphatic group is preferred.

The first monomer is not particularly limited, and for example, a vinyl monomer is preferred. With the use of the vinyl monomer, a block copolymer can be relatively easily produced by various living polymerization.

Specific examples of such a first monomer include, but are not particularly limited to, for example, behenyl acrylate, behenyl methacrylate, stearyl acrylate, stearyl methacrylate, hexadecyl acrylate, hexadecyl methacrylate, myristyl acrylate, myristyl methacrylate, lauryl acrylate, and lauryl methacrylate. Among them, one or more selected from the group consisting of behenyl acrylate, behenyl methacrylate, stearyl acrylate, stearyl methacrylate, hexadecyl acrylate, hexadecyl methacrylate, lauryl acrylate, and lauryl methacrylate is preferred. By using such first monomer, the adsorption strength to the surface of a formed product tends to be more improved. The first monomer may be used singly or two or more kinds may be used in combination.

The content (copolymerization ratio) of the first monomer constituting the copolymer is preferably 5 to 95 mass %, and more preferably 10 to 90 mass %, with respect to 100 mass % of the copolymer. With the content of the first monomer within the above range, the adsorption strength to the surface of a formed product tends to be more improved.

The weight average molecular weight of a block of the first monomer constituting the copolymer is preferably 2000 or more, and more preferably 3000 or more. The upper limit of the weight average molecular weight of the first monomer constituting the copolymer is not particularly limited, and is 100000 or less. The weight average molecular weight of the first monomer constituting the copolymer of 2000 or more, that is, longer long-chain alkane chain site that may contribute to the entanglement tends to increase the bonding ratio derived from the cocrystal interaction. This enables the copolymer to be more strongly bound to the surface of a formed product made of high-density polyethylene or ultra-high molecular weight polyethylene that have been difficult to be sufficiently modified. Measuring method of the weight average molecular weight of the first monomer is not particularly limited, as long as it is a conventionally-known method, and for example, examples thereof include a method of measuring by GPC after completion of the polymerization of a block of the first monomer and prior to the start of the polymerization of a block of the second monomer.

The second monomer is not particularly limited, as long as it has any of an amino group, an epoxy group, and an ether group, and a vinyl monomer having any of an amino group, an epoxy group, and an ether group is preferred. With the use of the vinyl monomer, a block copolymer can be relatively easily produced by various living polymerization. The functional group present in the second monomer is not particularly limited, as long as it is any of an amino group, an epoxy group, and an ether group, and two or more of these functional groups may be present in combination.

Specific examples of such second monomer include, but are not particularly limited to, for example, a monomer having an amino group such as 2-(dimethylamino)ethyl acrylate, 2-(dimethylamino)ethyl methacrylate, 2-(diethylamino)ethyl acrylate, 2-(diethylamino)ethyl methacrylate, 2-(tert-butylamino)ethyl acrylate, 2-(tert-butylamino)ethyl methacrylate, N,N-dimethylacrylamide, N,N-diethylacrylamide, and N,N-dimethylaminopropyl acrylamide; a monomer having an epoxy group such as glycidyl acrylate and glycidyl methacrylate; a monomer having an ether group such as polyethylene glycol monoacrylate and polyethylene glycol monomethacrylate and having a terminal hydroxyl group; and a monomer having an ether group such as alkoxy polyethylene glycol monoacrylate and alkoxy polyethylene glycol monomethacrylate and having a terminal alkoxy group. The second monomer may be used singly or two or more kinds may be used in combination.

The content (copolymerization ratio) of the second monomer constituting the copolymer is preferably 5 to 95 mass %, and more preferably 10 to 90 mass % with respect to 100 mass % of the copolymer. When the content of the second monomer is within the above range, the modification effect of the surface of a formed product tends to be more improved.

The content (concentration) of the copolymer in the surface modifying composition is preferably 2.0 mass % or less, more preferably 1.0 mass % or less, and further preferably 0.5 mass % or less with respect to 100 mass % of the surface modifying composition. With the content of the copolymer of 2.0 mass % or less, stacking of a plurality of layers of the copolymer at the same position and generation of peeling from the stacking portion can be more inhibited. The lower limit of the content (concentration) of the copolymer in the surface modifying composition is not particularly limited, and is 0.01 mass % or more.

[Solvent]

The solvent used in the present embodiment has a boiling point of 100° C. or more, and is at least one selected from the group consisting of a halogen-based solvent, an ether solvent, a ketone solvent, an aromatic solvent, an alkane solvent, a cycloalkane solvent, a dicycloalkane solvent, and a nitro-based solvent. The solvent used in the present embodiment may be a mixed solvent containing a plurality of solvents.

The boiling point of the solvent is 100° C. or more, preferably 120° C. or more, more preferably 130° C. or more, and further preferably 140° C. or more. With the boiling point of the solvent within the above range, the method of producing a modified product described below can be appropriately performed and the adsorption strength to the surface of a formed product is more improved. The boiling point according to the present embodiment means the one measured at atmospheric pressure.

The solvent used in the present embodiment is preferably at least one selected from the group consisting of a halogen-based solvent, an alkane solvent, a cycloalkane solvent, a dicycloalkane solvent, an aromatic solvent, and a nitro-based solvent, and among them, the aromatic solvent is preferred. With the use of such a solvent, the method of producing a modified product described below can be appropriately performed and the adsorption strength to the surface of a formed product tends to be improved.

Examples of the halogen-based solvent include, but are not particularly limited to, for example, chlorotoluene (162° C.), monochlorobenzene (131° C.), dichlorobenzene (180° C.), perchloroethylene (121° C.), and tetrachloroethane (146° C.). Examples of the ether solvent include, but are not particularly limited to, for example, dibutyl ether (142° C.) Furthermore, examples of the ketone solvent include, but are not particularly limited to, for example, diisopropyl ketone (125° C.). Examples of the aromatic solvent include, but are not particularly limited to, for example, ethylbenzene (136° C.) and tetralin (207° C.). Furthermore, examples of the alkane solvent include, but are not particularly limited to, for example, octane (126° C.). Examples of the cycloalkane solvent include, but are not particularly limited to, for example, cycloheptane (118° C.) and cyclooctane (149° C.). Furthermore, examples of the dicycloalkane solvent include, but are not particularly limited to, for example, decalin (186° C.). Examples of the nitro-based solvent include, but are not particularly limited to, for example, nitrobenzene (210° C.)

[Method of Producing Modified Product]

The method of producing a modified product of the present embodiment has a contacting step of warming a surface modifying composition to a temperature $T_1$, the surface modifying composition comprising a copolymer having a unit of a first monomer having an aliphatic group having 10 or more carbon atoms and a unit of a second monomer having any of an amino group, an epoxy group, and an ether group, and a solvent, and bringing the surface modifying composition into contact with the surface of a formed product made of high-density polyethylene or ultra-high molecular weight polyethylene; and a cooling step of lowering the temperature of the surface modifying composition from $T_1$ to $T_2$. By having such steps, sites to be bound by cocrystal interactions are more increased and the surface of a formed product made of high-density polyethylene or ultra-high molecular weight polyethylene that has been considered difficult to be sufficiently modified can be more effectively modified.

[Contacting Step]

In the contacting step, examples of the method of bringing the surface modifying composition into contact with the surface of a formed product include, but are not particularly limited to, for example, a method of attaching the droplet of the surface modifying composition to the surface of a formed product, a method of applying the surface modifying composition to the surface of a formed product, and a method of dipping a formed product in the surface modifying composition.

The surface modifying composition is only required to be contacted with a formed product in a state being warmed to the temperature $T_1$, and the surface modifying composition may be warmed either before being brought into contact with a formed product, or after being brought into contact with a formed product.

Temperature $T_1$ is a temperature 60° C. lower than the melting point Tm of the polyethylene constituting the formed product (Tm—60) or more, preferably (Tm—40) or more, and more preferably (Tm—30) or more. The upper limit of the temperature $T_1$ is not particularly limited, and is preferably Tm or less. With the temperature $T_1$ within the above range, sites to be bound by cocrystal interactions are more increased and the adsorption strength to the surface of a formed product is more improved. It is presumed that this is because the above temperature conditions more effectively advance the stage in which molecular chains are disentangled to the extent of being capable of entangling, but the mechanism is not limited thereto. Here, "melting point Tm of the polyethylene" means, when the moiety of a formed product is made of high-density polyethylene, the melting point of the high-density polyethylene, and when the moiety of a formed product is made of ultra-high molecular weight polyethylene, the melting point of the ultra-high molecular weight polyethylene.

As the copolymer, the same copolymer as above can be used. In addition, any solvent can be used without any particular limitation, as long as the solvent has a boiling point higher than the temperature $T_1$. Examples of the preferred aspect of the solvent include a solvent having a boiling point of 100° C. or more and being at least one selected from the group consisting of a halogen-based solvent, an alkane solvent, a cycloalkane solvent, a dicycloalkane solvent, an aromatic solvent, and a nitro-based solvent, like the above.

The lower limit of the contact time in a state being warmed to the temperature $T_1$ is not particularly limited, and is preferably 0.1 seconds or more, more preferably 0.5 seconds or more, further preferably 10 seconds or more, and particularly preferably 30 seconds or more. The upper limit of the contact time is also not particularly limited, and is preferably 60 minutes or less, and more preferably 10 minutes, from the viewpoint of productivity.

[Cooling Step]

The cooling step is a step of lowering the temperature of the surface modifying composition brought into contact with the surface of a formed product from $T_1$ to $T_2$. Examples of the method of cooling include, but are not particularly limited to, for example, a method of cooling naturally by allowing the surface modifying composition to stand, and a method of cooling actively (quenching) by lowering the outside air temperature.

The cooling rate in the cooling step is preferably –0.02 to –50° C./sec, more preferably –0.05 to –30° C./sec, and further preferably –0.05 to –10° C./sec. With the cooling rate within the above range, the adsorption strength to the surface of a formed product tends to be more improved.

Temperature $T_2$ is a temperature 80° C. lower than the melting point Tm of the polyethylene constituting the formed product (Tm—80) or less, preferably (Tm—90) or less, and more preferably (Tm—100) or less. The lower limit of the temperature $T_2$ is not particularly limited, and is preferably (Tm—140°) C. or more. With the temperature $T_2$ within the above range, the adsorption strength to the surface of a formed product is more improved.

[Modified Product]

A modified product of the present embodiment has a formed product made of high-density polyethylene or ultra-high molecular weight polyethylene, and a copolymer bound to the formed product in which the copolymer has a unit of a first monomer having an aliphatic group having 10 or more carbon atoms and a unit of a second monomer having any of an amino group, an epoxy group, and an ether group, and the copolymer is not separated from the formed product when left in water at 80° C. and in ethanol at 70° C. under the condition of 1 hour.

The modified product of the present embodiment can be obtained by using the above method of producing, and examples of the copolymer that binds to the modified product include the same as above.

The modified product of the present embodiment has a specific non-separating property. Even if a formed product is left in water at 80° C. under the condition of 1 hour, the copolymer is not separated from the formed product, and even if a formed product is left in ethanol at 70° C. under the condition of 1 hour, the copolymer is not separated from the formed product. In the case where the contacting step is conducted without warming the formed product to the given temperature, the copolymer easily separates from the formed product made of high-density polyethylene or ultra-high molecular weight polyethylene, when left in water at 80° C. and in ethanol at 70° C. under the condition of 1 hour. Thus, it is presumed that the non-separating property exerted by the modified product of the present embodiment (the strength of adhesion strength) is due to the increase in cocrystal interaction.

[Method of Producing Colored Product]

The method of producing a colored product of the present embodiment has a coloring step of attaching an ink containing a dye or a pigment to the modified surface of the modified product obtained by the above method of producing a modified product.

The ink containing a dye or a pigment is not particularly limited and a conventionally known ink can be appropriately used. The colored product thus obtained has improved color developability as compared with the case in which the same coloring step is performed to a formed product not modified by copolymer.

EXAMPLES

Hereinafter, the present invention will be described in more detail with Examples and Comparative Examples. The present invention is in no way limited by the following Examples.

Example 1

[Surface Modifying Composition A]

5.0 g of behenyl acrylate, 5.0 g of butyl acetate, and 0.38 g of BlocBuilder® MA (manufactured by ARKEMA) (initiator) were charged into a stirring polymerization apparatus, and the inside of the apparatus was substituted with nitrogen atmosphere. Thereafter, the polymerization was carried out for 24 hours while heating in an oil bath (110° C.). Then, 5.0 g of 2-(tert-butylamino)ethyl methacrylate and 5.0 g of butyl acetate were further charged into the stirring polymerization apparatus, and the polymerization was carried out for 24 hours while heating in an oil bath (110° C.). After polymerization, the reaction solution was added dropwise into methanol, the block copolymer of behenyl acrylate and 2-(tert-butylamino)ethyl methacrylate was allowed to precipitate, and the precipitate was filtered to obtain a copolymer. 0.35 g of the copolymer obtained and 349.65 g of xylene were mixed to obtain a surface modifying composition A (0.1 mass %). The weight average molecular weight of the block of behenyl acrylate in the copolymer was 10000.

[Surface Modifying Composition B]

0.35 g of the copolymer obtained in the preparation process of the surface modifying composition A and 349.65 g of decalin were mixed to obtain a surface modifying composition B (0.1 mass %).

11

12

[Surface Modifying Composition C]

0.35 g of the copolymer obtained in the preparation process of the surface modifying composition A and 349.65 g of isopropyl alcohol were mixed to obtain a surface modifying composition C (0.1 mass %).

[Surface Modification Test 1]

10 plates (thickness: 0.5 mm) made of high-density polyethylene (manufactured by Japan polyethylene Corporation, NOVATEC HD HJ560, density: 0.964 g/cm³, melting point: 135° C.) were prepared. After the plates were dipped in the surface modifying compositions A to C warmed to 100° C. for 10 minutes, the plates were immediately taken out and cooled at a rate of 25° C./sec to 25° C. After cooling, completely modified plates were taken out and naturally dried.

The same surface modification treatment was performed by using the surface modifying compositions A to C each warmed to 20° C., 40° C., 60° C., and 80° C., and thus 10 plates treated with different warming temperatures were each obtained. 10 plates subjected to no surface treatment were prepared as Comparative Example 1.

[Adhesion Test 1]

The modified surfaces of 2 plates obtained by using the surface modifying composition A warmed to 100° C. in the above surface modification test 1 were bonded together by using an adhesive (product name: Aron Alpha 201, manufactured by Toagosei Co., Ltd.) to obtain 5 test specimens in total. Thereafter, T-peel strength was measured according to JIS K6854-3 and the average value of the maximum load of 5 test specimens was calculated. In a similar manner, by using respective 10 plates obtained by using the surface modifying composition A warmed to 20° C., 40° C., 60° C., and 80° C. and 10 plates subjected to no surface treatment (Comparative Example 1-1), respective 5 test specimens in total were also obtained and the average value of the maximum load was calculated in a similar way as above.

In addition, with respect to respective 10 plates obtained by using the surface modifying compositions A to C each warmed to 20° C. and 100° C. and 10 plates subjected to no surface treatment (Comparative Example 1-1), respective 5 test specimens were further prepared in a similar manner as above, and the tensile shear strength was measured according to JIS K6850. The average value of the maximum load of 5 test specimens was calculated.

As is shown above, it was found that the maximum load significantly varies depending on the temperature conditions. In particular, in Examples 1-1 and 1-2 using the surface modifying composition A warmed to 80° C. and 100° C., it is found that the maximum load significantly increases such that it cannot be anticipated from the results of Reference Examples 1-1 to 1-3. In the case where the surface modifying composition A warmed to 100° C. was used, surprisingly, the adhesive surface of Aron Alpha was not peeled and the breakage phenomenon of the plate of high-density polyethylene itself was recognized. Furthermore, a high maximum load was obtained in Example 1-3 using the surface modifying composition B in which the solvent was changed into decalin, and on the other hand, no improvement in strength was recognized in Comparative Example 1-2 using the surface modifying composition C in which the solvent was changed into isopropyl alcohol.

Example 2

[Surface Modification Test 2]

10 plates (thickness: 0.5 mm) made of high-density polyethylene (manufactured by Japan polyethylene Corporation, NOVATEC HD HJ560, density: 0.964 g/cm³, melting point: 135° C.) were prepared. After the plates were dipped in the respective surface modifying compositions A warmed to 100° C. for 10 seconds, 1 minute, 5 minutes, 10 minutes, and 30 minutes, the plates were immediately taken out and cooled at a rate of 25° C./sec to 25° C. After cooling, completely modified plates were taken out and naturally dried.

[Adhesion Test 2]

The modified surfaces of 2 plates obtained in the surface modification test 2 were bonded together by using an adhesive (product name: Aron Alpha, manufactured by Toagosei Co., Ltd.) to obtain 5 test specimens for each dipping time. Thereafter, T-peel strength was measured according to JIS K6854-3 and the average value of the maximum load of 5 test specimens was calculated.

TABLE 1

| | Plate | Type | Surface modification test 1 (Temperature) | Adhesion test 1 T-peel strength (Maximum load) | Tensile shear strength (Maximum load) |
|---|---|---|---|---|---|
| Comparative Example 1-1 | High-density PE | — | not treated | 0.41N | 31.13 |
| Reference Example 1-1 | High-density PE | A | 20° C. | 0.82N | 75.11 |
| Reference Example 1-2 | High-density PE | A | 40° C. | 1.10N | 143.82 |
| Reference Example 1-3 | High-density PE | A | 60° C. | 2.30N | 193.93 |
| Example 1-1 | High-density PE | A | 80° C. | 6.44N | 206.72 |
| Example 1-2 | High-density PE | A | 100° C. | 11.12N | 227.68 |
| Example 1-3 | High-density PE | B | 100° C. | 6.76N | 201.43 |
| Comparative Example 1-2 | High-density PE | C | 80° C. | 1.10N | 144.26 |

TABLE 2

| | Surface modification test 2 (Temperature) | (Time) | Adhesion test 2 (Maximum load) |
|---|---|---|---|
| Example 2-1 | 100° C. | 10 seconds | 8.11N |
| Example 2-2 | 100° C. | 1 minute | 7.37N |
| Example 2-3 | 100° C. | 5 minutes | 10.40N |
| Example 2-4 | 100° C. | 10 minutes | 11.12N |
| Example 2-5 | 100° C. | 30 minutes | 15.91N |

As is shown above, it was found that when the temperature conditions are satisfied, a high maximum load can be obtained even for a very short time of 10 seconds. The ability of exerting the effect in such a short time is one of the advantages of the present invention and is especially advantageous when the present invention is practically utilized in various applications.

Meanwhile, in Reference Example 1-4, the maximum load obtained is inferior to that of Example 2-1 even if a longer time of 10 minutes is employed in the case of low temperature. From this, it is suggested that the adhesion mechanism of the surface modifying composition varies depending on the temperature, and the cocrystal interaction is considered to be more dominant than the crystalline supramolecular interaction in Examples 2-1 to 2-5. To exhibit the cocrystal interaction, a stage in which molecular chains are disentangled to the extent of being capable of entangling is considered to be required. Thus, it is consistent with the mechanism of exhibiting the cocrystal interaction that the longer the dipping time becomes in Examples 2-1 to 2-5, the more the maximum load increases.

Example 3

[Surface Modification Test 3]

5 plates (thickness: 0.5 mm) made of high-density polyethylene (manufactured by Japan polyethylene Corporation, NOVATEC HD HJ560, density: 0.964 g/cm$^3$, melting point: 135° C.) were prepared. After the plates were dipped in the surface modifying composition A warmed to 100° C. for 10 minutes, the plates were immediately taken out and cooled at a rate of 25° C./sec to 25° C. After cooling, completely modified plates were taken out and naturally dried. 5 plates subjected to no surface treatment were prepared as Comparative Example 3-1.

[Adhesion Test 3]

The modified surface of the plate obtained in the above surface modification test 3 and a vinyl chloride plate (manufactured by Meiwa Gravure Co., Ltd., Product code No. 25741636, thickness: 1 mm) were bonded together by using an adhesive (product name: Aron Alpha, manufactured by Toagosei Co., Ltd.) to obtain 5 test specimens in total. Thereafter, shear peel strength was measured according to JIS K6850 and the average value of the maximum load of 5 test specimens was calculated. In addition, the similar adhesion test was performed by using an epoxy-based adhesive (product name: Bond Quick 5, manufactured by Konishi Co., Ltd.) as an adhesive agent, instead of Aron Alpha. In a similar manner, with respect to 5 plates subjected to no surface treatment (Comparative Example 3-1), test specimens were also obtained and the average value of the maximum load was calculated in a similar way as above.

TABLE 3

| | Adhesion test 3 | |
| --- | --- | --- |
| | Aron Alpha | Epoxy-based adhesive |
| Example 3-1 | 265N | 101N |
| Comparative Example 3-1 | 54N | 37N |

In the above adhesion test, in the case where the high-density polyethylene plate modified with the surface modifying composition A and the vinyl chloride plate were bonded together with Aron Alpha, the vinyl chloride plate was extended by 100 mm or more and finally broken from the high-density polyethylene plate. In the case where the epoxy-based adhesive was used, the cured epoxy resin was peeled from the high-density polyethylene plate, resulting in termination of the test.

Example 4

[Surface Modifying Composition A']

A surface modifying composition A' (0.5 mass %) was obtained by the same preparation method as the surface modifying composition A, except that the concentration of the copolymer was set to 0.5 mass %.

[Surface Modifying Composition A"]

A surface modifying composition A" (0.01 mass %) was obtained by the same preparation method as the surface modifying composition A, except that the concentration of the copolymer was set to 0.01 mass %.

[Surface Modifying Composition D]

5.0 g of behenyl acrylate, 5.0 g of butyl acetate, and 0.38 g of BlocBuilder® MA (manufactured by ARKEMA) (initiator) were charged into a stirring polymerization apparatus, and the inside of the apparatus was substituted with nitrogen atmosphere. Thereafter, the polymerization was carried out for 24 hours while heating in an oil bath (110° C.). After polymerization, the reaction solution was added dropwise into methanol, the homopolymer of behenyl acrylate was allowed to precipitate, and the precipitate was filtered to obtain a homopolymer. 0.35 g of the homopolymer obtained and 349.65 g of xylene were mixed to obtain a surface modifying composition D (0.1 mass %). The weight average molecular weight of the homopolymer was 10000.

[Surface Modifying Composition E]

5.0 g of behenyl acrylate, 5.0 g of butyl acetate, and 0.38 g of BlocBuilder® MA (manufactured by ARKEMA) (initiator) were charged into a stirring polymerization apparatus, and the inside of the apparatus was substituted with nitrogen atmosphere. Thereafter, the polymerization was carried out for 24 hours while heating in an oil bath (110° C.). Then, 5.0 g of n-butyl acrylate and 5.0 g of butyl acetate were further charged into the stirring polymerization apparatus, and the polymerization was carried out for 24 hours while heating in an oil bath (110° C.). After polymerization, the reaction solution was added dropwise into methanol, the block copolymer of behenyl acrylate and n-butyl acrylate was allowed to precipitate, and the precipitate was filtered to obtain a copolymer. 0.35 g of the copolymer obtained and 349.65 g of xylene were mixed to obtain a surface modifying composition E (0.1 mass %). The weight average molecular weight of the block of behenyl acrylate in the copolymer was 10000.

[Surface Modification Test 4]

10 plates (thickness: 0.5 mm) made of high-density polyethylene (manufactured by Japan polyethylene Corporation, NOVATEC HD HJ560, density: 0.964 g/cm$^3$, melting point: 135° C.) were prepared. After the plates were dipped in each of the surface modifying compositions A, A', A", D, and E each warmed to 80° C. for 10 minutes, plates were immediately taken out and cooled at a rate of 25° C./sec to 25° C. After cooling, completely modified plates were taken out and naturally dried.

[Adhesion Test 4]

The modified surface of the plate obtained in the above surface modification test 4 and a vinyl chloride plate (manufactured by Meiwa Gravure Co., Ltd., Product code No. 25741636, thickness: 1 mm) were bonded together by using an adhesive (product name: Aron Alpha, manufactured by Toagosei Co., Ltd.) to obtain 5 test specimens in total. Thereafter, 180° peeling strength was measured according to JIS K6854-3 and the average value of the maximum load of 5 test specimens was calculated.

TABLE 4

| | | | | | Adhesion test 4 | |
| | Surface modification test 4 | | | | 180° peeling strength | Tensile shear strength |
| | Object | (Temperature) | Concentration | Type | (Maximum load) | (Maximum load) |
|---|---|---|---|---|---|---|
| Comparative Example 4-1 | High-density PE | not treated | — | A | 4.27N | 12.90 |
| Reference Example 4-1 | High-density PE | 20° C. | 0.1 | A | 4.14N | 8.64 |
| Example 4-1 | High-density PE | 100° C. | 0.1 | A | 10.89N | 21.72 |
| Example 4-2 | High-density PE | 100° C. | 0.5 | A' | 15.81N | 22.82 |
| Example 4-3 | High-density PE | 100° C. | 0.01 | A'' | 4.02N | 12.25 |
| Comparative Example 4-2 | High-density PE | 100° C. | 0.1 | D | 0.82N | — |
| Comparative Example 4-3 | High-density PE | 100° C. | 0.1 | E | 0.72N | — |
| Reference Example 4-2 | Low-density PE | 60° C. | 0.1 | A | 11.25N | — |

In the above adhesion test, in the case where the homopolymer of behenyl acrylate and the block copolymer of behenyl acrylate and n-butyl acrylate were used, it is found that the strength tends to be rather lowered. It is presumed that this is because coating of the polyethylene surface by the polymer not having the desired functional group rather contributes to the lowering of the strength. In addition, according to Reference Example 4-2 using a low-density polyethylene, an enough peeling strength can be obtained even at a low temperature in the case of using a low-density polyethylene, and it is found that there is no difficulty in adhesion such as high-density polyethylene.

Example 5

[Surface Modification Test 5]

Woven fabrics made of ultra-high molecular weight polyethylene fibers (product name: IZANAS, DD1191 (thin product), DD1312 (thick product), manufactured by Toyobo Co., Ltd.) were prepared. After respective woven fabrics were dipped in the surface modifying composition A warmed to 130° C. for 10 minutes, the woven fabrics were immediately taken out and cooled at a rate of 25° C./sec to 25° C. After cooling, completely modified woven fabrics were taken out and naturally dried.

[Dyeing Test 5]

After the woven fabrics obtained in the surface modification test 5 were colored with an ink (product name: poster color marine blue, manufactured by Asahipen Corporation) and dried for 24 hours, the ink was washed off with water or soapy water. The results are shown in FIG. 1.

As can be seen from FIG. 1, it was found that the woven fabrics subjected to the surface modification by using the surface modifying composition of the present invention are prone to be colored as a result of the surface modification.

Example 6

[Surface Modification Test 6]

Woven fabrics made of ultra-high molecular weight polyethylene fibers (product name: IZANAS DD1191 (thin product), manufactured by Toyobo Co., Ltd.) and woven fabrics made of ultra-high molecular weight polyethylene fibers (product name: IZANAS, DD1312 (thick product), manufactured by Toyobo Co., Ltd.) were prepared. After each of the woven fabrics was dipped in the surface modifying composition A warmed to 100° C. for 10 minutes, the woven fabrics were immediately taken out and cooled at a rate of 25° C./sec to 25° C. After cooling, completely modified woven fabrics were taken out and naturally dried.

To compare the case of being subjected to the surface treatment by the surface modifying composition A with the case of being subjected to the surface treatment by corona treatment and atmospheric pressure plasma treatment that are known as the typical surface treatment, with respect to the following woven fabrics made of a fiber (product name: IZANAS DD1191 (thin product), manufactured by Toyobo Co., Ltd.) and woven fabrics made of a fiber (product name: IZANAS, DD1312 (thick product), manufactured by Toyobo Co., Ltd.), woven fabrics subjected to corona treatment, atmospheric pressure plasma treatment 1, and atmospheric pressure plasma treatment 2 under the following conditions instead of the treatment using the surface modifying composition A were obtained.

(Corona Treatment)

Apparatus: table type equipment (manufactured by KASUGA DENKI, Inc.)

Conditions: 120 W min/m$^2$ (180 W, 3.5 m/min), in air (Atmospheric Pressure Plasma Treatment 1)

Apparatus: plasma surface modification apparatus (product name: MyPL Auto-100DLC, manufactured by WELL CORPORATION)

Conditions: He 50 L/min, O$_2$ 50 cc/min, 10 mm/sec, 150 W

Electrode height: 2.3 mm

Number of reciprocations: 1 time (Atmospheric Pressure Plasma Treatment 2)

Apparatus: plasma surface modification apparatus (product name: MyPL Auto-100DLC, manufactured by WELL CORPORATION)

Conditions: He 50 L/min, O$_2$ 50 cc/min, 10 mm/sec, 150 W

Electrode height: 4.0 mm

Number of reciprocations: 3 times

[Dyeing Test 6-1]

5 g of Kayastain Q (manufactured by Shikisensha Co., Ltd.), which is an indicator for differentiation of fibers capable of dyeing with different colors depending on the types of fibers, was dissolved in 500 g of water at 70° C. to prepare a dye solution. Respective woven fabrics obtained in the surface modification test 6 were sufficiently wetted with water at 70° C., then dipped in the dye solution prepared, boiled for 5 minutes, and dyed. Finally, the woven fabrics were further rinsed with water sufficiently, and dried at room temperature. The results are shown in FIG. 2.

Figure 3:
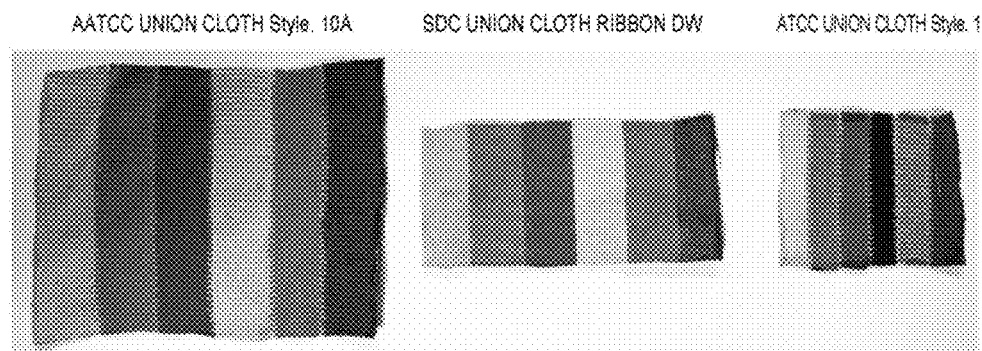
FIG. 3 shows a photograph showing the results of dyeing test woven fabrics with an indicator for differentiation of fibers in the dyeing test 2.

As a control, test woven fabrics (product name: AATCC union cloth fabric Style. 10A, SDC union cloth ribbon DW, and ATCC union cloth fabric Style. 1, each manufactured by Shikisensha Co., Ltd.) were prepared and dyed in the same process as above. The results are shown in FIG. 3. Note that the AATCC union cloth fabric Style. 10A is made of, from the left of FIG. 3, diacetate/cotton/nylon 66/polyester/acrylic/wool for each site distinguished by colors, the SDC union cloth ribbon DW is made of, from the left of FIG. 3, diacetate/cotton/nylon 66/polyester/acrylic/wool for each site distinguished by colors, and AATCC union cloth fabric Style. 1 is made of, from the left of FIG. 3, diacetate/cotton/nylon 66/silk/rayon/wool for each site distinguished by colors. When being dyed with Kayastain Q, which is an indicator for differentiation of fibers, these test woven fabrics have different colors due to the difference in fiber type.

Figure 2:
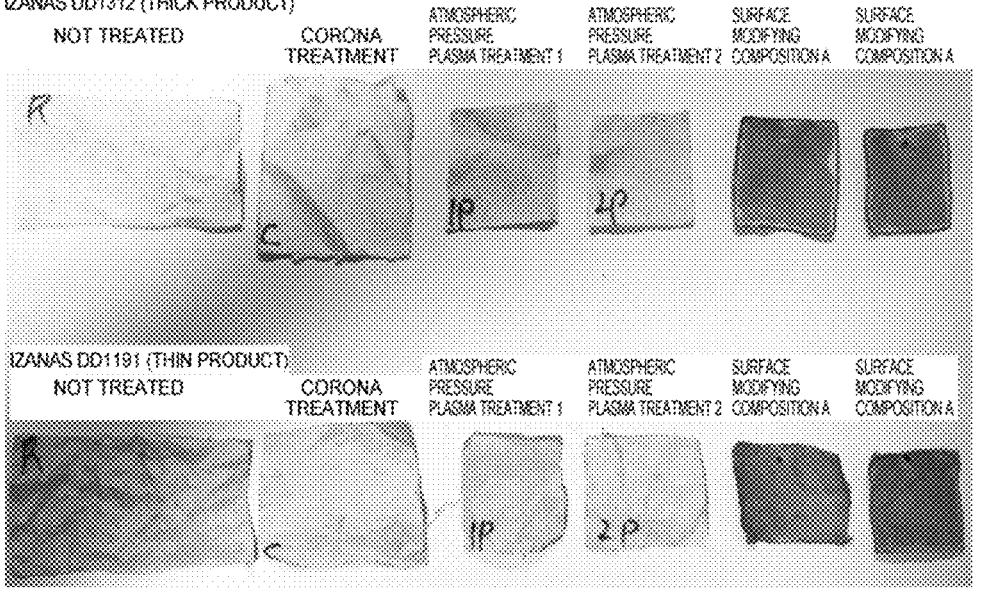
FIG. 2 shows a photograph showing the results of dyeing sample woven fabrics with an indicator for differentiation of fibers in the dyeing test 2.

As shown in FIGS. 2 and 3, the results of dyeing with the surface modifying composition were close to that of dying of nylon and wool. This demonstrates that the surface modifying composition has modified the ultra-high molecular weight polyethylene fiber and it is presumed that the surface modifying composition showed color development similar to that of nylon and wool by reacting the amino group in the second monomer of the copolymer bound to the ultra-high molecular weight polyethylene fiber. In addition, it is obvious that the woven fabrics are easily dyed in the case of using the surface modifying composition, as compared with the case of corona treatment and atmospheric pressure plasma treatment. Furthermore, it was also found that no surface modifying composition is eliminated from the fiber surface, even when boiling was performed in the dyeing process.

[Dyeing Test 6-2]

To evaluate the dyeing properties after the surface treatment, 2 g of COLD DYE HOT (red) (manufactured by KATSURAYA FINE GOODS. CO., LTD.) was dissolved in 50 g of water at 90° C., and diluted so that the final solution volume may be 1 L, followed by adding 13 mL of vinegar (Mizkan Holdings Co. Ltd., cereal vinegar) as an aid to prepare a dye solution. Respective woven fabrics obtained in the surface modification test 6 were dipped in the dye solution prepared (90° C.) for 20 minutes and dyed with gently stirring. As soaping, the woven fabrics were dipped in a detergent solution made by dissolving 2 g of a neutral detergent for kitchen (Kao Corporation, Kyukutto Clear disinfecting green tea scent) in about 1 L of water at about 50° C. and washed. Finally, the woven fabrics were further rinsed with water sufficiently, and dried at room temperature. The results are shown in FIG. 4.

Figure 5:
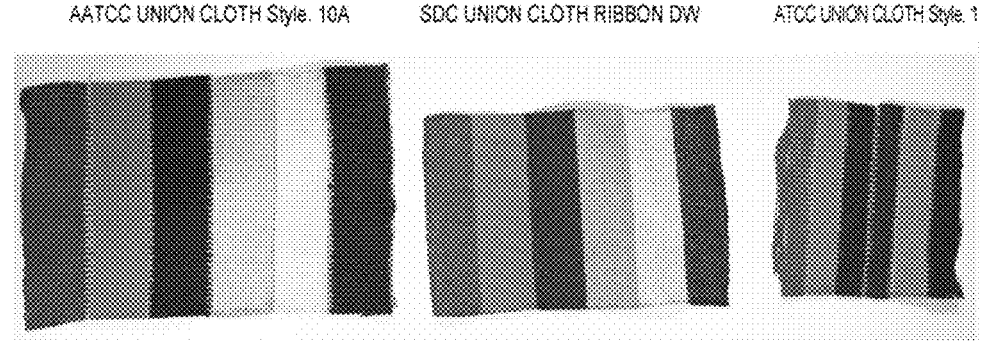
FIG. 5 shows a photograph showing the results of dyeing test woven fabrics with an indicator for differentiation of fibers in the dyeing test 3.

As a control, test woven fabrics (product name: AATCC union cloth fabric Style. 10A, SDC union cloth ribbon DW, and ATCC union cloth fabric Style. 1, each manufactured by Shikisensha Co., Ltd.) were prepared and dyed in the same process as above. The results are shown in FIG. 5. Note that the AATCC union cloth fabric Style. 10A is made of, from the left of FIG. 5, diacetate/cotton/nylon 66/polyester/acrylic/wool for each site distinguished by colors, the SDC union cloth ribbon DW is made of, from the left of FIG. 5, diacetate/cotton/nylon 66/polyester/acrylic/wool for each site distinguished by colors, and the AATCC union cloth fabric Style. 1 is made of, from the left of FIG. 5, diacetate/cotton/nylon 66/silk/rayon/wool for each site distinguished by colors. These test woven fabrics have different degree of dyeing with COLD DYE HOT (red) due to the difference in fiber type.

Figure 4:
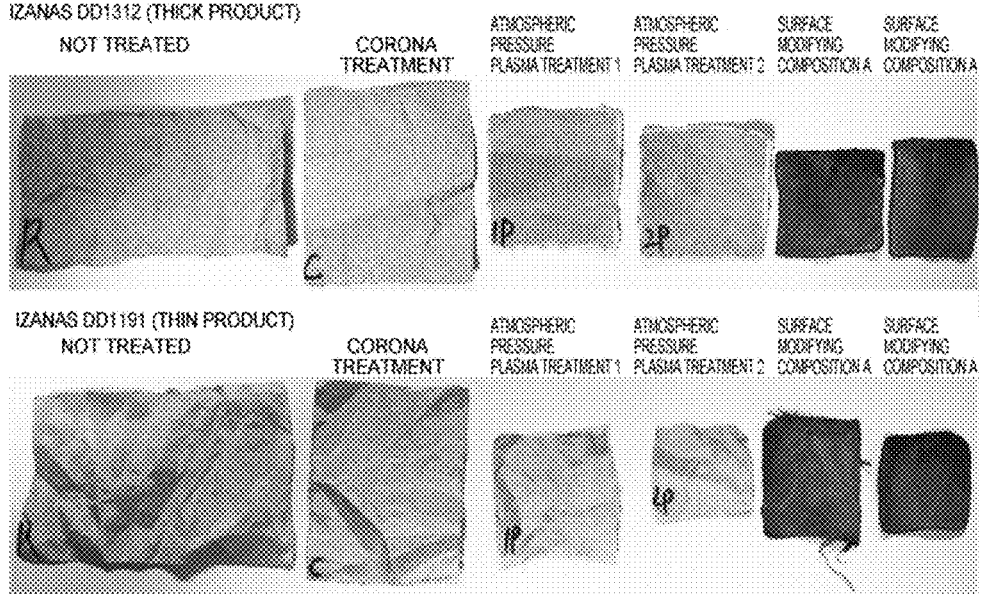
FIG. 4 shows a photograph showing the results of dyeing sample woven fabrics with an indicator for differentiation of fibers in the dyeing test 3.

As shown in FIGS. 4 and 5, the results of dyeing with the surface modifying composition were, in the order of high dyeing density, nylon 66, wool, silk, diacetate, rayon, polyester, and acrylic. In addition, it is obvious that the woven fabrics are easily dyed in the case of using the surface modifying composition, as compared with the case of corona treatment and atmospheric pressure plasma treatment. Furthermore, it was also found that no surface modifying composition is eliminated from the fiber surface, even when heating was performed at 90° C. in the dyeing process.

Example 7

[Peeling Test 7-1]

Respective test specimens used in Comparative Example 1-1, Reference Examples 1-1 to 1-3, and Examples 1-1 to 1-3 were left in water at 80° C. for 1 hour. After leaving, when an attempt was made to peel the polyethylene plates from each other by hand, test specimens of Comparative Example 1-1 and Reference Examples 1-1 to 1-3 were easily peeled from the adhesive surface. On the other hand, test specimens of Examples 1-1 to 1-3 were not peeled and held the strength.

[Peeling Test 7-2]

Respective test specimens used in Comparative Example 1-1, Reference Examples 1-1 to 1-3, and Examples 1-1 to 1-3 were left in ethanol at 70° C. for 1 hour. After leaving, when an attempt was made to peel the polyethylene plates from each other by hand, test specimens of Comparative Example 1-1 and Reference Examples 1-1 to 1-3 were easily peeled from the adhesive surface. On the other hand, test specimens of Examples 1-1 to 1-3 were not peeled and held the strength.

INDUSTRIAL APPLICABILITY

The present invention has an industrial applicability as a surface modifying composition used for modifying the surface of a formed product made of high-density polyethylene or ultra-high molecular weight polyethylene.

The invention claimed is:

1. A method of producing a modified product, the method comprising:

a contacting step of warming a surface modifying composition to a temperature $T_1$, the surface modifying composition comprising a block copolymer having a block of a first monomer having an aliphatic group having 10 or more carbon atoms and a weight average molecular weight of at least 2000, and a block of a second monomer having an amino group or an epoxy group, and a solvent and bringing the surface modifying composition into contact with a surface of a formed product made of a high-density polyethylene or an ultra-high molecular weight polyethylene; and a cooling step of lowering the temperature of the surface modifying composition from $T_1$ to $T_2$;

wherein when the modified product is left in water at 80° C. and in ethanol at 70° C. for 1 hour, the block copolymer is not separated from the formed product, and wherein the solvent is one or more selected from the group consisting of an alkane solvent, a cycloalkane, a dicycloalkane, an aromatic solvent, and a nitro solvent, and wherein the solvent has a boiling point of 100° C. or more at atmospheric pressure;

wherein $T_1$ is a temperature from (Tm—60) to Tm, wherein (Tm—60) is a temperature 60° C. lower than Tm, and wherein Tm is the melting point of the polyethylene constituting the formed product, and wherein $T_2$ is (Tm—80), wherein (Tm—80) is a temperature 80° C. lower than Tm.

2. A method of producing a colored product, comprising a coloring step of attaching an ink containing a dye or a pigment to a modified surface of the modified product obtained by the method of producing a modified product according to claim 1.

3. A modified product produced by the method of claim 1.

4. The method of claim 1, wherein the aliphatic group present in the first monomer has from 20 to 30 carbon atoms.

5. The method of claim 1, wherein the solvent is selected from the group consisting of a cycloalkane, a dicycloalkane, and a nitro solvent.

6. The method of claim 1, wherein the solvent is an aromatic solvent.

7. The method of claim 6, wherein the aromatic solvent is xylenes.

8. The method of claim 1, wherein the cooling step has a cooling rate of from −0.05 to −10° C./sec.

\* \* \* \* \*